(No Model.) 3 Sheets—Sheet 2.
C. W. BAIRD.
SIDE DELIVERY HAY RAKE AND LOADER.
No. 508,396. Patented Nov. 14, 1893.
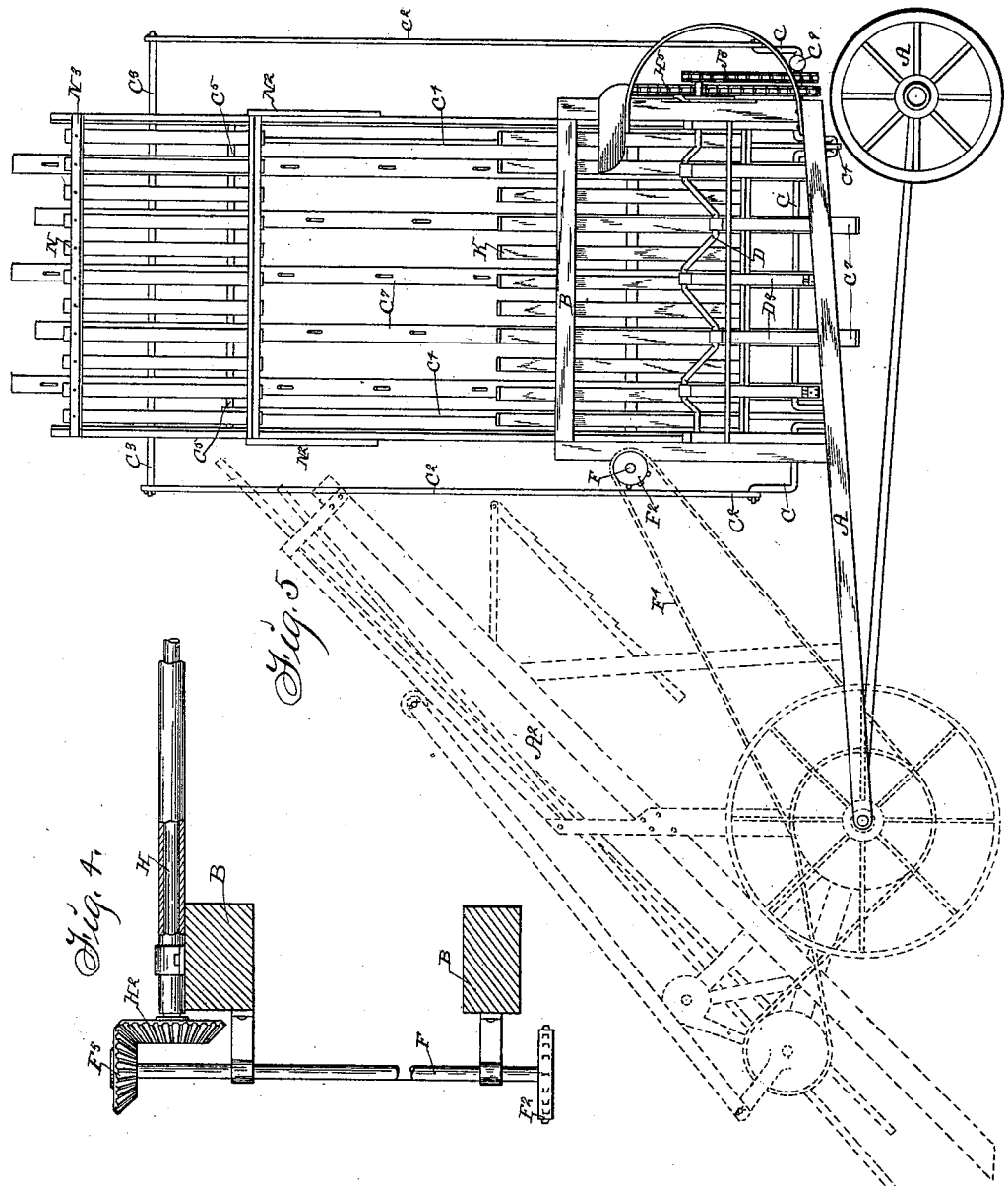

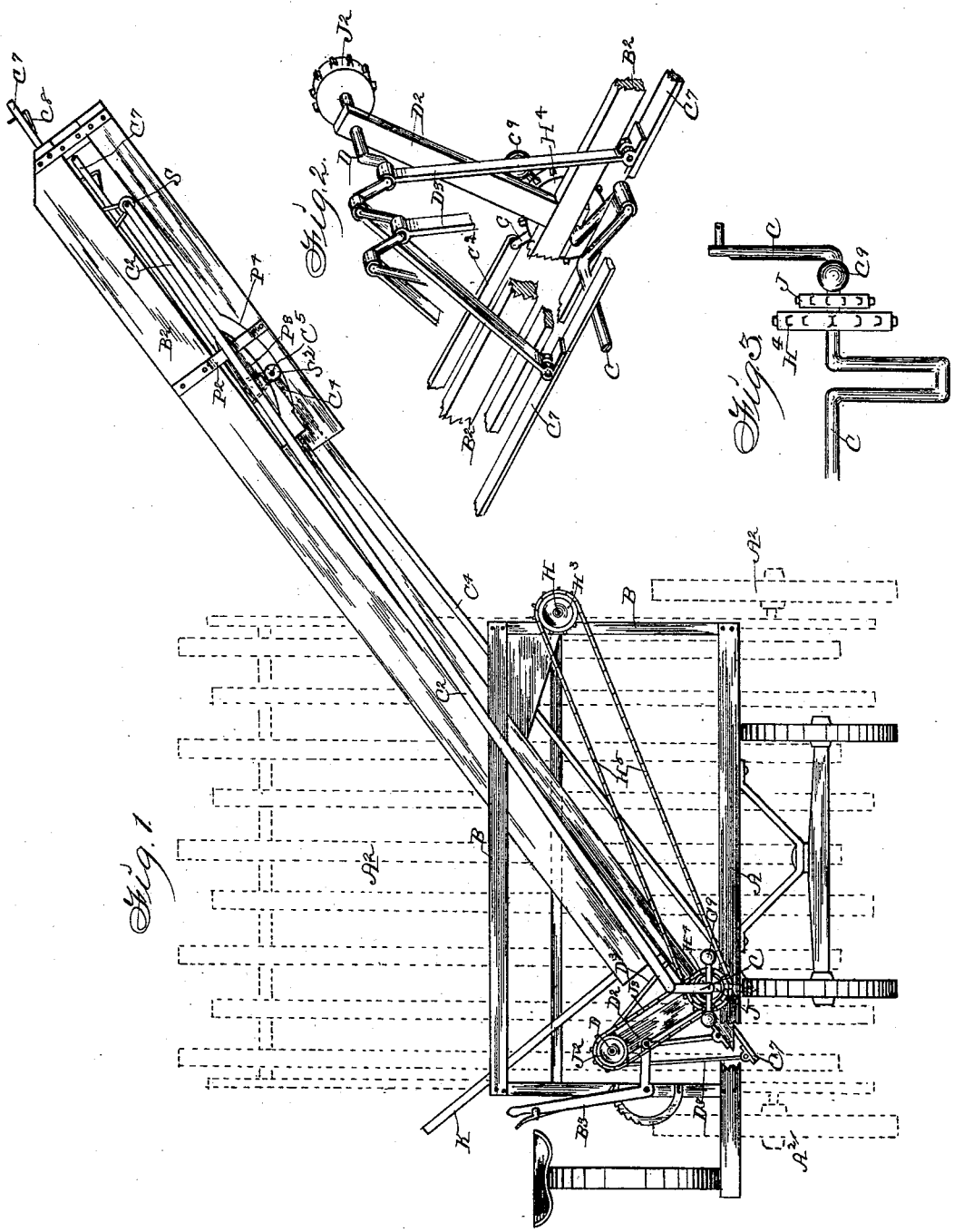

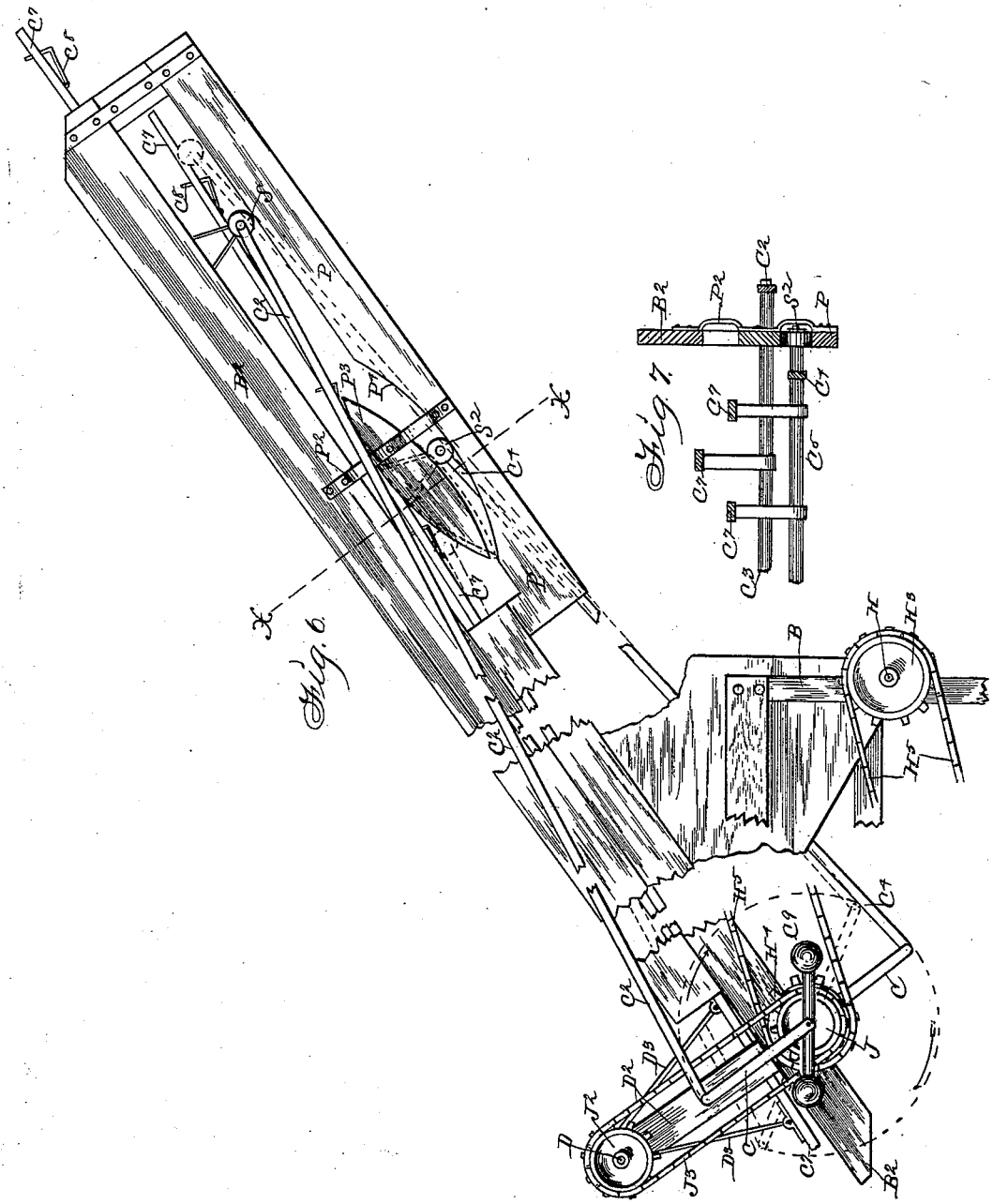

UNITED STATES PATENT OFFICE.

CHARLES W. BAIRD, OF MILLERSBURG, IOWA.

SIDE-DELIVERY HAY RAKE AND LOADER.

SPECIFICATION forming part of Letters Patent No. 508,396, dated November 14, 1893.

Application filed January 21, 1893. Serial No. 459,289. (No model.)

*To all whom it may concern:*

Be it known that I, CHARLES W. BAIRD, a citizen of the United States of America, residing at Millersburg, in the county of Iowa and State of Iowa, have invented an Improvement in Side-Delivery Hay Rakes and Loaders, of which the following is a specification.

The object of my invention is, first, to provide improved and simplified means for supporting and imparting a slight rotary movement, to the lower end portions of elevator bars, which have other means whereby they are longitudinally reciprocated.

A further object is, to provide means for preventing the wind from blowing the hay from the top of the elevator and for partially compressing the hay so as to deliver the hay upon a wagon in a compact form, that may be conveniently handled.

A further object is, to provide simple, strong and durable mechanism whereby the upper end portions of one set of elevator bars are raised above the remaining ones during their upward movement and dropped below them during their downward movement to the more readily engage and disengage the hay.

My invention consists, first, in providing means for imparting a longitudinally reciprocating movement to the elevator bars, in combination with hangers hinged to the lower ends of said elevator bars and attached to the oppositely disposed cranks of a crank shaft, to impart a slight rotary movement to the said elevator bars and to operate with a minimum of friction.

My invention consists further in the construction and arrangement of a gate at the upper end portion of the forward elevator to prevent the wind from blowing the hay from the elevator and to aid in delivering the hay in a compact, uniform manner upon a wagon.

My invention consists further, in the construction, arrangement and combination of parts whereby the upper end portions of one set of the elevator bars are elevated above the remaining ones during their upward stroke and dropped below them during their downward stroke.

My invention consists further in certain other features of construction, arrangement and combination of parts hereinafter more specifically set forth, pointed out in my claims and illustrated in the accompanying drawings in which—

Figure 1 is a front elevation of the forward elevator, the position of the rear rake and elevator being indicated by dotted lines, and the upper ends of the elevator bars being arranged to slide, longitudinally of the frame. Fig. 2 is an enlarged, detail, perspective view showing the construction and arrangement of the elevator box hangers. Fig. 3 is an enlarged detail view of a portion of one of the crank shafts and connective parts. Fig. 4 is an enlarged, detail, top view of parts of the mechanism for transmitting motion from the rear traction wheels to the elevator bars. Fig. 5 is a side elevation of the complete forward elevator, the position of the rear elevator being indicated by dotted lines. Fig. 6 is a side view of a portion of the forward elevator to show the construction of the device for elevating the outer ends of elevator bars and the arrangement and combination thereof relative to other operative parts, the dotted lines show the parts in a different position to show the operation. Fig. 7 is a transverse sectional view through the line $x-x$ of Fig. 6.

Referring to the accompanying drawings, the reference letter A is used to designate the carriage and $A^2$ a hay rake and elevator mounted upon said carriage and adapted to receive the motion from the traction wheels of said carriage.

B designates a supporting frame erected upon the forward end portion of said carriage and $B^2$ is a hay elevator frame pivotally mounted upon said frame on the shaft H at right angles to the carrier and adapted to be moved vertically by means of the mechanism $B^3$ in an ordinary manner. Mounted in suitable bearings in the lower end of the elevator frame $B^2$ is a crank shaft C having two oppositely disposed crank arms formed in each end. The rods $C^2$ are pivotally attached to the outer two of said crank arms and are attached to the cross pieces $C^3$ at their upper ends, and the remaining crank arms have the rods $C^4$ pivotally attached thereto and to a cross bar $C^5$ at their upper ends. These cross bars $C^3$ and $C^5$ are supported by the frame $C^6$ in which they may slide longitudinally of the frame.

$C^7$ designates elevator bars of the ordinary construction, each alternate one being attached to the cross bar $C^5$ and the remainder to the cross bar $C^3$ so that upon a rotation of the crank shaft C each alternate elevator bar will be reciprocated in an opposite direction longitudinally of the elevator frame.

$C^8$ designates tines for engaging the hay said tines being composed of elbow-shaped wires pivotally attached to the under side of the said bars and extended upwardly through slots formed in said bars.

$C^9$ designates balance weights secured to the shaft C to rotate therewith and overcome irregularities in the operation of the device.

It is desirable that the elevator bars be slightly raised above the others upon their upward stroke and slightly lowered upon their downward stroke, to the more readily engage and disengage the hay. This raising and lowering of the elevator bars is accomplished in this instance as follows:

D designates a shaft having oppositely disposed crank arms and rotatably mounted in bearings in the uprights $D^2$ which are secured to the lower end portion of the elevator frames. Pivotally attached to the said crank arms are the hangers $D^3$ which have hinged connection with the elevator bars, so that a rotary movement will be imparted to the elevator bars when said crank shaft is operated.

Means are provided for operating the hereinbefore described mechanism as follows:

F designates a shaft mounted in bearings secured to the rear of the frame B and having a sprocket wheel $F^2$ on its one end and a bevel gear wheel $F^3$ on its remaining end. This shaft is geared to the axle of the traction wheels of the carriage by means of the sprocket chain $F^4$.

H designates a shaft mounted in suitable bearings in the side of the frame B and having on its one end a bevel gear wheel $H^2$ adapted to mesh with the wheel $F^3$ and upon its other end a sprocket wheel $H^3$. This wheel $H^3$ is connected with a like wheel designated by the reference symbol $H^4$ which is fixed to the crank shaft C. By means of the sprocket chain $H^5$ the crank shaft D is arranged to be operated in unison with the shaft C by means of the like sprocket wheels J and $J^2$ fixed respectively in the shaft C and D and connected by the sprocket chain $J^3$. These crank shafts are so arranged relative to each other that the elevator bars which are being moved outwardly will be elevated above those moving backwardly so that the hay will be the more readily engaged by the tines in the elevator bars when being advanced.

K designates guide bars hinged to the sides of the frame $B^2$ and having their upper end portions resting upon one of the horizontal pieces of the frame B and they serve to receive the hay from the rear elevator and direct it to the forward elevator.

N designates a gate hinged to the uprights $N^2$ which in turn are fixed to the sides of the top portion of the forward elevator frame. At its upper end is a cross piece $N^3$ which overlaps the sides of the elevator frame and holds the gate above the said side pieces. It will be obvious that the hay will readily raise said gate when of sufficient bulk and also that said gate will prevent the hay from being blown backward by the wind.

Means are provided for elevating the upper end portion of one set of the elevator bars above the remaining ones during the upward stroke and for dropping the same below the elevator bars during their downward stroke as follows:

P designates an auxiliary frame or track secured to the under edge of each of the side pieces of the frame $B^2$.

$P^2$ is a bracket secured to the frame $B^2$ and the frame or track P, and $P^3$ is an elongated elliptical block pivoted near its upper end to said bracket $P^2$ and in alignment with the side pieces $B^2$ and the frame or track P and adapted to have its lower end rest upon the latter. The top edge of the aforesaid frame P is curved downwardly at $P^4$.

S designates an anti-friction roller mounted upon the end of the cross bar $C^3$ and adapted to travel along the top edge of the auxiliary frame or track P and $S^2$ is a like roller mounted upon the end of the cross bar $C^5$ and arranged to travel on the top edge of the elliptical block $P^3$ and also on the concaved surface $P^4$ of the frame or track P. Inasmuch as each alternate elevator bar is fixed to the cross bar $C^5$ it will readily be seen that when the roller $S^2$ is on top of said ellipse the said elevator bars will be elevated above the remaining ones, and when on the concaved surface $P^4$ said elevator bars will be below the rest.

The movement of the upper ends of the elevator bars connected with the upper cross bar $C^3$ is approximately in a straight line and the movement of the remaining ones is as follows: Assuming that the roller $S^2$ is in the position shown in the drawings, a further downward movement of the roller will elevate the lower end portion of the ellipse $P^3$ and pass beyond it. The lower end of the ellipse will then by force of gravity be brought into a position resting upon the upper edge of frame or track P so that as the roller $S^2$ is again moved upwardly it will pass on top of the ellipse and elevate the elevator bars connected therewith above the remaining ones, then as it passes beyond the upper end of the ellipse the said ellipse by force of gravity will assume the position shown in the drawings and compel the roller $S^2$ to return beneath it.

It will be understood that the construction and arrangement of parts upon both sides of the frame are identical though but one has been described.

Having thus described the construction and function of each part of the device in its turn a further description of their unitary action is deemed superfluous.

What I claim as my invention, and desire to secure by Letters Patent, is—

1. A hay elevator, comprising the following elements, to wit; a suitable elevator frame $B^2$, the auxiliary frames or tracks P secured to the side pieces thereof—a cross bar $C^3$ adapted to slide longitudinally of said frame or track, a like cross bar $C^5$ below the aforesaid one, a concave portion $P^4$ formed in the track or frame in the path of the cross bar $C^5$, a bracket $P^2$ on each side of the frame secured to the main and auxiliary frames as shown, an elliptical block $P^3$ pivoted eccentrically to each of said brackets, and in alignment with said frames to operate as set forth, elevator bars connected alternately with the cross bars $C^3$ and $C^5$, in combination with means for reciprocating the elevator bars, comprising the crank shaft C having its oppositely disposed crank arms, the bars $C^2$ and $C^4$ connected with said crank arms and with the cross bars $C^3$ and $C^5$, the second crank shaft D having hangers $D^2$ connected therewith and with the elevator bars and means for operating said crank shafts simultaneously, from the traction wheels of the device, substantially as set forth.

2. In a hay elevator the combination of the following elements to wit: a suitable elevator frame, a plurality of elevator bars mounted therein, means for elevating the lower end portions of each alternate elevator bar during its upward stroke and means whereby the upper end portions of one set of the alternate elevator bars are operated approximately in a straight line and means whereby the upper end portion of the remaining set of alternate elevator bars are raised above the rest during their upward stroke and dropped below them during their downward stroke for the purposes stated.

3. In a hay elevator the combination of the following elements to wit: a suitable elevator frame, a cross bar at the top portion of said frame adapted to slide longitudinally thereof means for reciprocating said cross bar, a plurality of elevator bars connected with said cross bar, a like number of elevator bars arranged alternately with the aforesaid ones, a cross bar connecting them and means for reciprocating said cross bar, a suitable track in each side of the elevator frame upon which the said lower cross bar may slide, an elliptical block pivoted eccentrically above each of the said tracks to allow the lower cross bar to pass above them during its upward stroke and beneath them during its downward stroke for the purposes stated.

4. In a hay elevator the combination of the following elements to wit: a suitable elevator frame $B^2$ the auxiliary frames or tracks P secured to the side pieces thereof, a cross bar $C^3$ adapted to slide longitudinally of said frames or tracks, a like cross bar $C^5$ below the aforesaid one, a concave portion $P^4$ formed in the track or frame in the path of the cross bar $C^5$ a bracket $P^2$ on each side of the frame secured to the main and auxiliary frames as shown, an elliptical block $P^3$ pivoted eccentrically to each of said brackets and in alignment with said frames to operate as set forth, elevator bars connected alternately with the cross bars $C^3$ and $C^5$ and means for alternately reciprocating said cross bars substantially in the manner set forth for the purposes stated.

CHARLES W. BAIRD.

Witnesses:
MICHAEL BERRY,
J. L. MILLER.